US011881132B2

(12) United States Patent
Lan et al.

(10) Patent No.: US 11,881,132 B2
(45) Date of Patent: Jan. 23, 2024

(54) DISPLAY PANEL AND DISPLAY DEVICE

(71) Applicant: YUNGU (GU'AN) TECHNOLOGY CO., LTD., Hebei (CN)

(72) Inventors: Ping Lan, Langfang (CN); Jiazuo Cai, Langfang (CN); Jiading Liu, Langfang (CN)

(73) Assignee: YUNGU (GU'AN) TECHNOLOGY CO., LTD., Langfang (CN)

( * ) Notice: Subject to any disclaimer, the term of this patent is extended or adjusted under 35 U.S.C. 154(b) by 0 days.

(21) Appl. No.: 17/740,701

(22) Filed: May 10, 2022

(65) Prior Publication Data

US 2022/0270529 A1 Aug. 25, 2022

Related U.S. Application Data

(63) Continuation of application No. PCT/CN2021/080208, filed on Mar. 11, 2021.

(30) Foreign Application Priority Data

May 19, 2020 (CN) ......................... 202010427125.8

(51) Int. Cl.
*G09G 3/00* (2006.01)

(52) U.S. Cl.
CPC .................................... *G09G 3/006* (2013.01)

(58) Field of Classification Search
CPC ... G09G 3/006; G09G 2300/0426; G09F 9/30
See application file for complete search history.

(56) References Cited

U.S. PATENT DOCUMENTS

| | | | | |
|---|---|---|---|---|
| 9,099,526 | B2 * | 8/2015 | Or-Bach | H01L 23/544 |
| 9,905,583 | B2 * | 2/2018 | Zhang | H01L 27/124 |
| 2004/0108518 | A1 * | 6/2004 | Jo | G09G 3/3291 257/200 |
| 2007/0030408 | A1 | 2/2007 | Lin et al. | |

(Continued)

FOREIGN PATENT DOCUMENTS

| | | | |
|---|---|---|---|
| CN | 101369589 | A | 2/2009 |
| CN | 103513454 | A | 1/2014 |

(Continued)

OTHER PUBLICATIONS

International Search Report dated Jun. 9, 2021, in corresponding to International Application No. PCT/CN2021/080208; 6 pages (with English Translation).

(Continued)

*Primary Examiner* — Akm Zakaria
(74) *Attorney, Agent, or Firm* — Maier & Maier, PLLC

(57) ABSTRACT

A display panel and a display device. The display panel includes a test circuit located in a non-display region. The test circuit includes a plurality of switching transistors and at least one data switching line extending in a first direction. In each switching transistor, a first end of the switching transistor is electrically connected to a data line in the display panel, and a second end of the switching transistor is configured to receive a test data signal. The data switching line is disposed in the same layer as a source-drain layer of the switching transistor. The data switching line is configured to control the switching transistor to be turned on or off.

11 Claims, 4 Drawing Sheets

(56) References Cited

U.S. PATENT DOCUMENTS

| | | | | |
|---|---|---|---|---|
| 2008/0068525 | A1* | 3/2008 | Ishii | G02F 1/136209 349/44 |
| 2016/0260367 | A1* | 9/2016 | Kwak | G09G 3/3291 |
| 2018/0033354 | A1* | 2/2018 | Lee | G09G 3/006 |
| 2019/0006390 | A1* | 1/2019 | Park | H01L 29/41733 |
| 2020/0081308 | A1 | 3/2020 | Yoshida | |
| 2021/0407435 | A1* | 12/2021 | Tang | H10K 59/13 |
| 2022/0328598 | A1* | 10/2022 | Zhao | G09G 3/006 |

FOREIGN PATENT DOCUMENTS

| | | | |
|---|---|---|---|
| CN | 103926719 | A | 7/2014 |
| CN | 104460161 | A | 3/2015 |
| CN | 105652539 | A | 6/2016 |
| CN | 106652870 | A | 5/2017 |
| CN | 107068046 | A | 8/2017 |
| CN | 107180594 | A | 9/2017 |
| CN | 107818968 | A | 3/2018 |
| CN | 107861658 | A | 3/2018 |
| CN | 109448618 | A | 3/2019 |
| CN | 109839767 | A | 6/2019 |
| CN | 110085601 | A | 8/2019 |
| CN | 110444120 | A | 11/2019 |
| CN | 110927997 | A | 3/2020 |
| CN | 111508369 | A | 8/2020 |

OTHER PUBLICATIONS

First Office Action dated Jul. 7, 2021, Corresponding to Chinese Application No. 202010427125.8; 14 pages (with machine-generated English Translation).

The Second Office Action dated Aug. 25, 2021, corresponding to Chinese Application No. 202010427125.8; 14 pages (with machine-generated English Translation).

The Third Office Action dated Oct. 13, 2021, corresponding to Chinese Application No. 202010427125.8; 20 pages (with machine-generated English Translation).

Notice of Rejection dated Jan. 17, 2022, corresponding to Chinese Application No. 202010427125.8; 20 pages (with machine-generated English Translation).

* cited by examiner

DISPLAY PANEL AND DISPLAY DEVICE

CROSS-REFERENCE TO RELATED APPLICATIONS

This application is a continuation of International Patent Application No. PCT/CN2021/080208, filed on Mar. 11, 2021, which claims priority to Chinese Patent Application No. 202010427125.8 filed on May 19, 2020, the disclosures of both of which are incorporated herein by reference in their entireties.

TECHNICAL FIELD

The present disclosure relates to the field of display technology, for example, a display panel and a display device.

BACKGROUND

With the development of display technologies, the application of display panels is becoming more and more extensive. Accordingly, the requirements for the display panels are getting higher and higher.

A display panel usually includes a test circuit, and a data switching line in the test circuit has a great risk of short circuit. As a result, the display panel has the problem of a poor display, and the display effect is seriously affected.

SUMMARY

The present disclosure provides a display panel and a display device to reduce a risk of a short circuit of a data switching line in the display panel and to improve the display effect.

The present disclosure provides a display panel. The display panel includes a test circuit located in a non-display region. The test circuit includes a plurality of switching transistors and a data switching line extending in a first direction.

In each switching transistor, a first end of the switching transistor is electrically connected to a data line in the display panel, and a second end of the switching transistor is configured to receive a test data signal.

The data switching line is disposed in the same layer as a source-drain layer of each switching transistor. The data switching line is configured to control the switching transistor to be turned on or off.

The present disclosure further provides a display device. The display device includes the display panel as described above.

The display panel according to the present disclosure includes the test circuit located in the non-display region. The test circuit includes a plurality of switching transistors. The first end of each switching transistor is electrically connected to the data line in the display panel. The second end of each switching transistor is configured to receive the test data signal. The test circuit also includes the data switching line extending in the first direction. The data switching line is disposed in the same layer as the source-drain layer of the switching transistor. The data switching line is configured to control the switch transistor to be turned on or off. In this configuration, the data switching line is disposed in the same layer as the source-drain layer rather than disposed in the same layer as the gate of a thin-film transistor in a display region. Therefore, the risk of the charges generated by the contact of the data switching line and subsequent films with a roller, a stage, a pad or a pin during a photolithographic process and a dry etching process can be reduced. At the same time, an accumulation process can also be reduced. That is, there are a relatively small number of subsequent conductive films of the film where the data switching line is located. Therefore, the charges accumulated on the data switching line can be reduced, and the risk of the short circuit of the data switching line due to the breakdown of a gate insulating layer caused by the charge release of the data switching line can be reduced. Thus, a poor display of the display panel can be prevented, and the display panel can have a good display effect.

DETAILED DESCRIPTION

The present disclosure is described below in conjunction with drawings and embodiments.

The reason for a great risk of a short circuit of a data switching line in a display panel is that the data switching line in the display panel is disposed in the same layer as a gate electrode of a thin-film transistor of the display panel. During the manufacturing process of the data switching line, a photolithographic process and a dry etching process may cause serious charge accumulation, and the breakdown of a gate insulating layer may be caused when charges are released, so that the data switching line is short-circuited. As a result, a poor display of the display panel appears, and a display effect is seriously affected.

Figure 1:
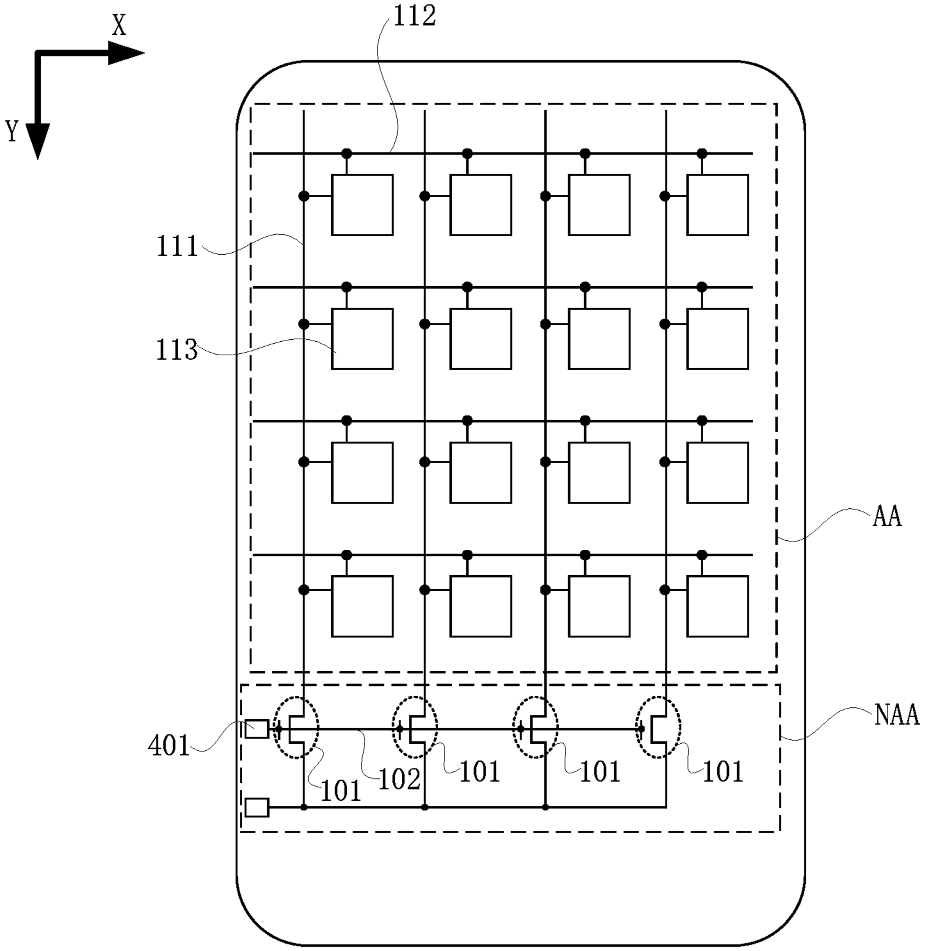
FIG. 1 is a view illustrating the structure of a display panel according to an embodiment.

FIG. 1 is a view illustrating the structure of a display panel according to an embodiment. Referring to FIG. 1, the display panel includes a test circuit located in a non-display region NAA. The test circuit includes a plurality of switching transistors 101. A first end of the switching transistor 101 is electrically connected to a data line 111 in the display panel. A second end of the switching transistor 101 is configured to receive a test data signal. The test circuit further includes a data switching line 102 extending in a first direction X. The data switching line 102 is disposed in the same layer as a source-drain layer of the switching transistor 101. The data switching line 102 is configured to control the switching transistor 101 to be turned on or off.

The display panel may include a plurality of data lines 111 and a plurality of scan lines 112 which are criss-crossed and located in a display region AA. The data lines 111 and the scan lines 112 crisscross to form a plurality of pixel regions. The display panel may include a plurality of pixel driving circuits 113 respectively located in the plurality of pixel regions. The scan lines 112 and the data lines 111 provide scan signals and data signals to pixel driving circuits 113 respectively. The circuit structure and the working method of the pixel driving circuits 113 are not repeated here. After the manufacturing of the display panel is completed, a series of tests is required, such as a cell test (CT), to determine whether the display panel is intact. The test circuit may be configured to test the display panel. A plurality of switching transistors 101 may be electrically connected to a plurality of data lines 111 in the display panel in a one-to-one correspondence. The test data signal is input to the second end of the switching transistor 101, and the switching transistor 101 is turned on in response the action of a control signal of the data switching line 102. Therefore, the test data signal is transmitted to the data line 111 and then to a corresponding pixel driving circuit 113 to drive a corresponding light-emitting structure to emit light. In FIG. 1, only four rows and four columns of pixel regions, and four switching transistors are shown exemplarily. However, the number of the pixel regions and the number of the switching transistors of the present disclosure is not limited to this. Moreover, in FIG. 1, second ends of the switching transistors 101 are electrically connected to the same test pad. In some other embodiments, second ends of different switching transistors 101 may also be connected to different test pads as long as the test data signal can be input.

Figure 2:
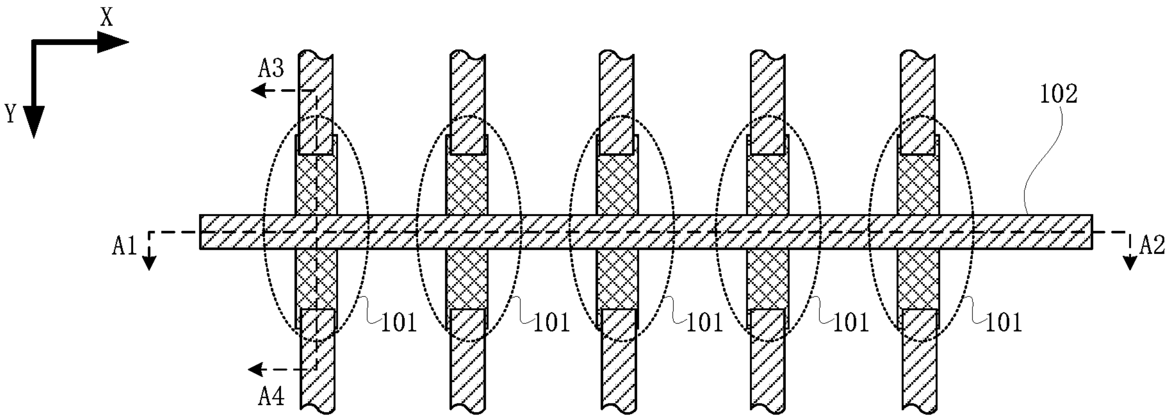
FIG. 2 is a view illustrating the film structure of a display panel according to an embodiment.
Figure 3:
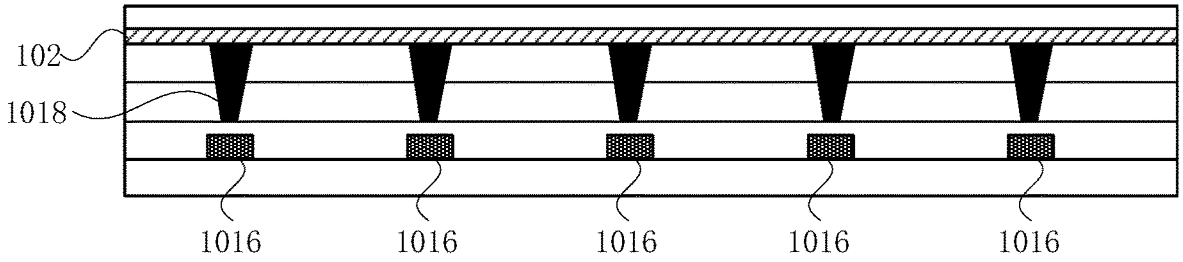
FIG. 3 is a section view taken along section line A1-A2 of FIG. 2 to illustrate the film structure according to an embodiment.
Figure 4:
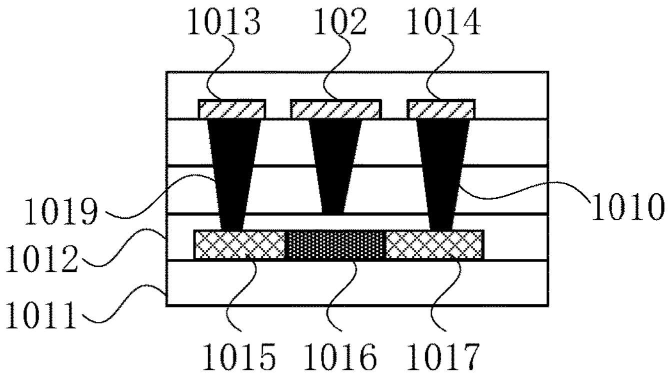
FIG. 4 is a section view taken along section line A3-A4 of FIG. 2 to illustrate the film structure according to an embodiment.

FIG. 2 is a view illustrating film structure of a display panel according to an embodiment. FIG. 3 is a section view taken along section line A1-A2 of FIG. 2 to illustrate the film structure according to an embodiment. FIG. 4 is a section view taken along section line A3-A4 of FIG. 2 to illustrate the film structure according to an embodiment. The display panel may include a substrate 1011, a gate insulating layer 1012, an active layer, a gate layer, a source-drain layer, and an interlayer insulating layer between the gate layer and the source-drain layer. In some other embodiments, the display panel may further include a capacitance electrode layer and an interlayer insulating layer between the capacitance electrode layer and a source-drain layer. The active layer includes a heavily doped region 1016 and lightly doped regions located on two sides of the heavily doped region 1016, that is, a first lightly doped region 1015 and a second lightly doped region 1017. The first lightly doped region 1015 is electrically connected to a first electrode 1013 of the switching transistor 101 by a first via hole 1019. The first electrode 1013 may be a source of the switching transistor 101. The second lightly doped region 1017 is electrically connected to a second electrode 1014 of the switching transistor 101 by a second via hole 1010. The second electrode 1014 may be a drain of the switching transistor 101. In response to the action of the control signal of the data switching line, the first lightly doped region 1015 is in a conduction with the second lightly doped region 1017. Therefore, the first end of the switching transistor 101 is in a conduction with the second end of the switching transistor 101. The switching transistors 101 may be P-type transistors or N-type transistors. In this embodiment, the data switching line is disposed in the same layer as the source-drain layer rather than disposed in the same layer as the gate of the thin-film transistor in the display region. Therefore, the risk of the charges generated by the contact of the data switching line and subsequent films with a roller, a step, a pad or a pin during the photolithographic process and the dry etching process can be reduced. At the same time, an accumulation process can also be reduced. That is, there are a relatively small number of subsequent conductive films of the film where the data switching line 102 is located. Therefore, the charges accumulated on the data switching line 102 can be reduced, and the risk of the short circuit of the data switching line 102 due to the breakdown of the gate insulating layer 1012 caused by the charge release of the data switching line 102 can be reduced. Thus, a poor display of the display panel can be prevented, and the display panel can have a good display effect. In this embodiment, unless otherwise described, the active layer, the gate layer, the gate insulating layer and the source-drain layer of the switching transistor 101 are disposed in the same layer as an active layer, a gate layer, a gate insulating layer and a source-drain layer of a transistor in the display region of the display panel respectively.

In embodiment, the display panel includes the test circuit located in the non-display region. The test circuit includes a plurality of switching transistors. The first end of the switching transistor is electrically connected to the data line in the display panel. The second end of the switching transistor is configured to receive the test data signal. The test circuit also includes the data switching line extending in the first direction. The data switching line is disposed in the same layer as the source-drain layer of the switching transistor. The data switching line is configured to control the switching transistor to be turned on or off. In this configuration, the data switching line is disposed in the same layer as the source-drain layer rather than disposed in the same layer as the gate of the thin-film transistor in the display region. Therefore, the risk of the charges generated by the contact of the data switching line and the subsequent films with the roller, the step, the pad or the pin during the photolithographic process and the dry etching process can be reduced. At the same time, the accumulation process can also be reduced. That is, there are a relatively small number of subsequent conductive films of the film where the data switching line is located. Therefore, the charges accumulated on the data switching line can be reduced, and the risk of the short circuit of the data switching line due to the breakdown of the gate insulating layer caused by the charge release of the data switching line can be reduced. Thus, a poor display of the display panel can be prevented, and the display panel can have a good display effect.

When the vertical projection of the data switching line 102 on the plane where the active layer is located overlaps the heavily doped region 1016, and the portion of the data switching line 102 corresponding to an overlapping region of the vertical projection can be used as a gate electrode of the switching transistor 101. In some other embodiments, to improve the control capacity of the data switching line 102 to the heavily doped region 1016, a third via hole 1018 may be disposed. One end of the third via hole 1018 is electrically connected to the data switching line 102, and another end of the third via hole 1018 is connected to a side of the gate insulating layer 1012 of the switching transistor 101 close to the data switching line 102.

Figure 5:
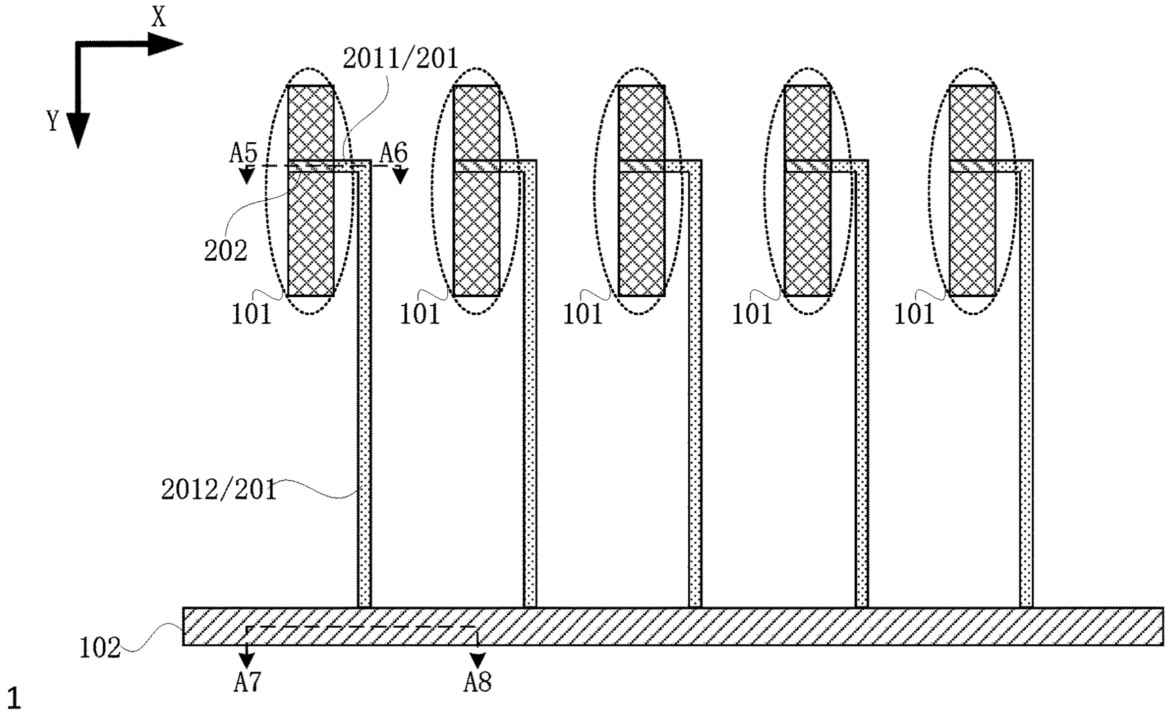
FIG. 5 is a view illustrating the film structure of a display panel where a vertical projection of a data switching line on the plane where an active layer of a switching transistor is located does not overlap the active layer of the switching transistor according to an embodiment.

In an embodiment, FIG. 5 is a view illustrating film structure of another display panel according to an embodiment. Referring to FIG. 5, the vertical projection of the data switching line 102 on the plane where the active layer of the switching transistor 101 is located does not overlap the active layer of the switching transistor 101.

In this embodiment, with the arrangement in which the vertical projection of the data switching line 102 on the plane where the active layer of the switching transistor 101 is located does not overlap the active layer of the switching transistor 101, even if the charges on the data switching line 102 are released, the data switching line 102 and the data lines 111 are not short-circuited.

Thus, the risk of a poor display of the display panel can be reduced, and the display panel can ensure a high display effect.

In an embodiment, referring to FIG. 5, the display panel further includes a plurality of branch lines 201 corresponding to a plurality of switching transistors 101 in a one to one correspondence. One end of each branch line 201 is electrically connected to the data switching line 102, and another end of each branch line 201 is electrically connected to the gate electrode 202 of the switching transistor 101.

The branch line 201 is configured to make the control signal of the data switching line 102 be transmitted to the gate electrode 202 of the switching transistor 101, and then the first end of the first transistor 101 is in a conduction with the second end of the first transistor 101. Therefore, the test data signal is written to the data lines 111 of the display panel and the test function is completed.

In an embodiment, the branch line includes a first metal wire 2011 and a second metal wire 2012 which are electrically connected. The first metal wire 2011 extends in the first direction X and is electrically connected to the gate electrode 202 of the switching transistor 101. The second metal wire 2012 is electrically connected to the first metal wire 2011. The second metal wire 2012 extends in a second direction Y and is electrically connected to the data switching line 102. The first direction X is perpendicular to the second direction Y.

The gate electrode 202 of the switching transistor 101 may extend in the first direction X. A branch line 201 corresponding to the switching transistor 101 and the gate electrode 202 of the switching transistor 101 form an L-shaped structure. In the region where the active layer of a plurality of switching transistors 101 is located, a plurality of gate electrodes 202 are equivalent to a plurality of small divided segments. Compared with a case where the gate electrode 202 is a penetrating metal wire in the first direction X, a plurality of gate electrodes 202 can reduce the risk of the accumulation of wire charges. At the same time, the second metal wire 2012 extends in the second direction Y. In the manufacturing process, the second metal wire 2012 is perpendicular to the transport direction of a substrate. Therefore, the risk that the charges accumulated on the second metal wire 2012 in the process can be reduced. Thus, the risk of the short circuit of the data switching line 102 and the data lines 111 can be prevented. In this embodiment, the defect rate that the data lines 111 in the display region of the display panel are poor due to the short circuit of the data switching line 102 is reduced by more than 99.5%. Thus, the poor display can be avoided.

Figure 6:
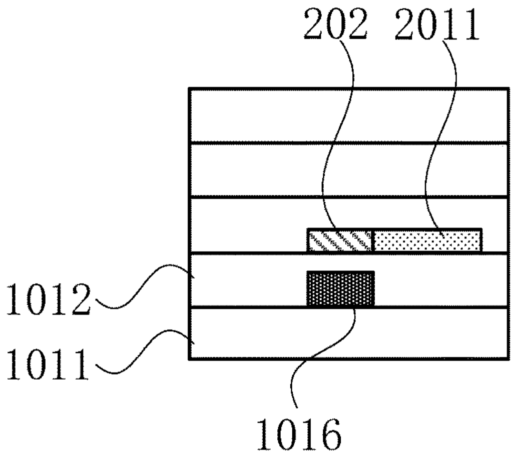
FIG. 6 is a section view taken along section line A5-A6 of FIG. 5 to illustrate the film structure according to an embodiment.
Figure 7:
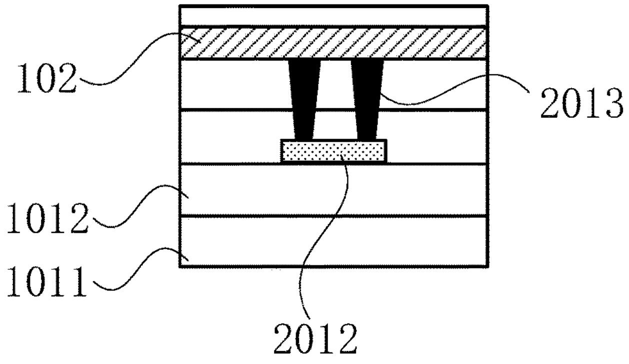
FIG. 7 is a section view taken along section line A7-A8 of FIG. 5 to illustrate the film structure according to an embodiment.

In an embodiment, FIG. 6 is a section view taken along section line A5-A6 of FIG. 5 to illustrate the film structure according to an embodiment. FIG. 7 is a section view taken along section line A7-A8 of FIG. 5 to illustrate the film structure according to an embodiment. With reference to FIGS. 5 to 7, the branch line 201 is disposed in the same layer as the gate electrode 202 of the switching transistor 101. With this arrangement, the connection difficulty between the branch line 201 and the gate electrode 202 can be reduced. The branch line 201 and the gate electrode 202 may be the same metal wire. In this embodiment, the gate electrode 202 of the switching transistor 101 is located in the same layer as the gate electrode of the thin-film transistor in the display region AA. As shown in FIG. 7, a fourth via hole 2013 is provided to make the second metal wire 2012 be electrically connected to the data switching line 102.

Figure 8:
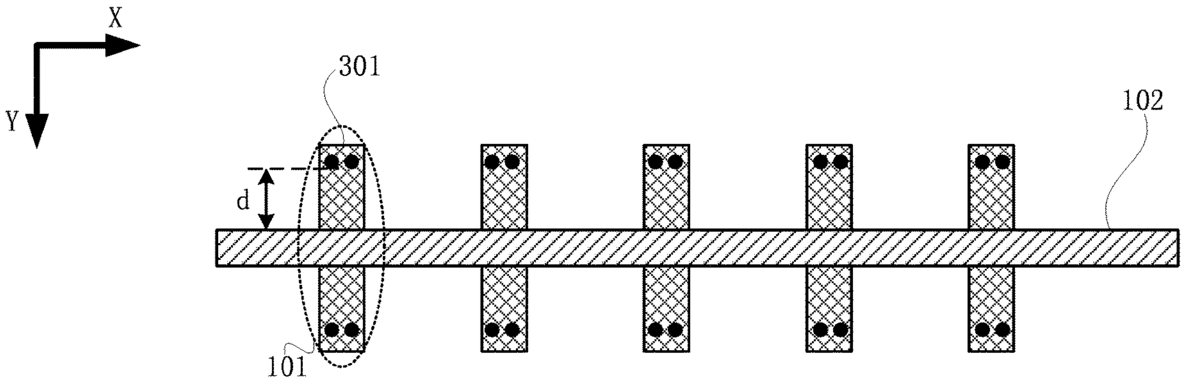
FIG. 8 is a view illustrating the film structure of a display panel including via holes according to an embodiment.

In an embodiment, FIG. 8 is a view illustrating film structure of another display panel according to an embodiment. Referring to FIG. 8, the vertical projection of the data switching line 102 on the plane where the active layer of the switching transistor 101 is located overlaps the active layer of the switching transistor 101. The display panel further includes via holes 301 connected to the active layer. The distance d between the data switching line 102 and the via holes 301 in the second direction Y is greater than 4 microns. The second direction X is perpendicular to the first direction Y.

The active layer of the switching transistor 101 corresponding to the via hole 301 is connected, through the via hole 301, to the source or drain of the switching transistor 101 corresponding to the via hole 301. The charges on the data switching line 102 can be released when a high-low potential difference is provided. The charges generated on the data switching line 102 in the photolithographic process and the dry etching process form a high-low potential with the lift-off process in the manufacturing process of the via holes 301, so that the charges are released. With the arrangement in which the distance d is greater than 4 microns, the risk of the charge release is reduced. Thus, the risk of the short circuit of the data switching line 102 and the data lines 111 can be reduced, and the risk of the poor display of the display panel can be reduced. In this embodiment, the defect rate that the data lines 111 in the display region of the display panel are poor due to the short circuit of the data switching line 102 is reduced by more than 99.0%. Thus, the display effect is improved. In this embodiment, the data switching line 102 may also be disposed in the same layer as the gate electrode of the thin-film transistor in the display region and may be disposed according to actual situations. This is not limited in this embodiment.

In an embodiment, the distance d between the data switching line 102 and the via holes 301 in the second direction Y may be greater than or equal to 13 microns. With the arrangement in which the distance d is within this range, the risk of the charge release can be reduced. Therefore, the risk of the short circuit of the data switching line 102 can be reduced. In this embodiment, the defect rate that the data lines 111 in the display region of the display panel are poor due to the short circuit of the data switching line 102 is reduced by more than 99.3%. Thus, the display effect of the display panel is improved.

The distance d between the data switching line 102 and the via holes 301 in the second direction Y may be less than 16 microns. If the distance d is too large, the area of the active layer of the switching transistor 101 corresponding to the data switching line 102 is also large. Since the switching transistors 101 are disposed in the non-display region NAA, the width of the non-display region NAA may be increased. Thus, the bezel of the display panel is increased. With the arrangement in which the distance d is less than 16 microns, a narrow bezel of the display panel is implemented.

In an embodiment, referring to FIG. 1, the test circuit further includes a test pad 401. The data switching line 102 is electrically connected to the test pad 401.

When the display panel needs to be tested, a test device may be electrically connected to the test pad 401, and then the control signal may be input to the data switching line 102 to control the switching transistor 101 corresponding to the data switching line 102 to be turned on or off. In this manner, subsequently, the test data signal is written to the data lines 111 by the switching transistors 101.

In an embodiment, the material of the data switching line 102 is titanium aluminum titanium (Ti/Al/Ti). The risk of the charge accumulation on Ti/Al/Ti alloy is small. With this arrangement, the risk of the charge accumulation on the data switching line 102 can be reduced. Thus, the risk of the poor display of the display panel can be reduced, and the display effect is improved.

In the present disclosure, the risk of the short circuit of the data switching line 102 is reduced. The defect rate that the data lines in the display region of the display panel are poor due to the short circuit of the data switching line is reduced by more than 99%. Thus, the display effect is improved greatly.

Figure 9:
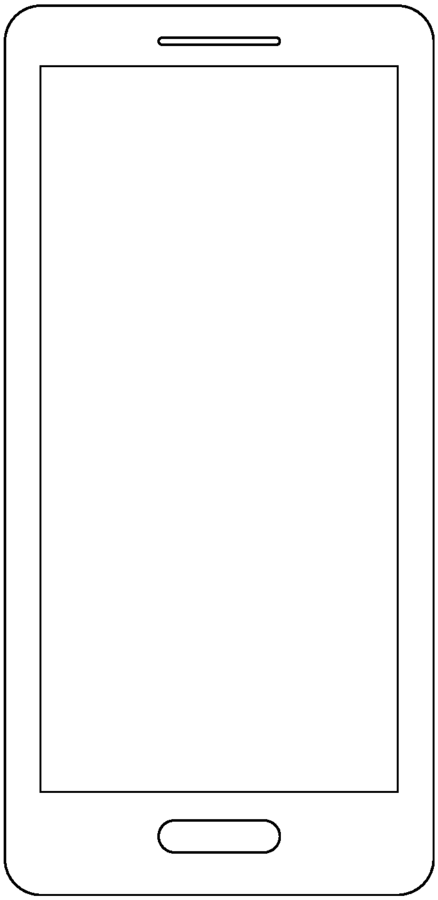
FIG. 9 is a view illustrating the structure of a display device according to an embodiment.

FIG. 9 is a view illustrating the structure of a display device according to an embodiment. Referring to FIG. 9, the display device provided by this embodiment includes the display panel provided by any of the previous embodiments. Therefore, the display device has the same effect, and the details are not repeated here. The display device may be a mobile phone, a tablet computer, a display, a smartwatch, a moving picture experts group audio layer 3 (MP3) player, a moving picture experts group audio video layer 4 (MP4) player or other wearable devices.

What is claimed is:

1. A display panel, comprising a test circuit located in a non-display region, wherein the test circuit comprises:

a plurality of switching transistors, wherein a first end of each switching transistor is electrically connected to a data line in the display panel, and a second end of each switching transistor is configured to receive a test data signal;

a data switching line extending in a first direction, wherein the data switching line is disposed in a same layer as a source-drain layer of each switching transistor, and the data switching line is configured to control each switching transistor to be turned on or off; and a via hole connected to an active layer on which the switching transistors are located, wherein a distance provided between the data switching line and the via hole in a second direction is greater than 4 microns, wherein the second direction is perpendicular to the first direction, wherein a vertical projection of the data switching line on a plane of the active layer overlaps the active layer, and a portion of the data switching line corresponding to an overlapping region of the vertical projection is a gate electrode of the switching transistors.

2. The display panel according to claim 1, wherein the active layer comprises a heavily doped region, and a first lightly doped region and a second lightly doped region located on two sides of the heavily doped region; and in response to an action of a control signal of the data switching line, the first lightly doped region is in a conduction with the second lightly doped region.

3. The display panel according to claim 1, wherein the distance between the data switching line and the via hole in the second direction is less than 16 microns.

4. The display panel according to claim 1, wherein the test circuit further comprises a test pad, and the data switching line is electrically connected to the test pad.

5. The display panel according to claim 1, wherein a material of the data switching line is titanium aluminum titanium (Ti/Al/Ti).

6. The display panel according to claim 1, wherein the second ends of the plurality of switching transistors are electrically connected to a same test pad.

7. The display panel according to claim 1, wherein the second ends of the plurality of switching transistors are electrically connected to different test pads.

8. The display panel according to claim 1, wherein the via hole is provided in the switching transistor, and the via hole connects the active layer with a source of the switching transistor or a drain of the switching transistor.

9. The display panel according to claim 1, further comprising a third via hole, wherein one end of the third via hole is electrically connected to the data switching line, and another end of the third via hole is connected to a side of a gate insulating layer of the switching transistor close to the data switching line.

10. The display panel according to claim 1, wherein the distance between the data switching line and the via hole in the second direction is greater than 13 microns.

11. A display device, comprising the display panel according to claim 1.

* * * * *